(12) United States Patent
Henrion et al.

(10) Patent No.: US 9,676,473 B2
(45) Date of Patent: Jun. 13, 2017

(54) LANDING GEAR WITH REALIGNING LOCK LINK ASSEMBLY

(71) Applicant: MESSIER-BUGATTI-DOWTY, Velizy Villacoublay (FR)

(72) Inventors: Philippe Henrion, Velizy-Villacoublay (FR); Dominique Ducos, Velizy-Villacoublay (FR); Nicolas Nguyen, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/646,796

(22) PCT Filed: Nov. 29, 2013

(86) PCT No.: PCT/EP2013/075129
§ 371 (c)(1),
(2) Date: May 22, 2015

(87) PCT Pub. No.: WO2014/083170
PCT Pub. Date: Jun. 5, 2014

(65) Prior Publication Data
US 2015/0314860 A1    Nov. 5, 2015

(30) Foreign Application Priority Data

Nov. 30, 2012   (FR) ...................................... 12 03253

(51) Int. Cl.
*B64C 25/20*       (2006.01)
*B64C 25/26*       (2006.01)

(52) U.S. Cl.
CPC .............. *B64C 25/20* (2013.01); *B64C 25/26* (2013.01)

(58) Field of Classification Search
CPC ......... B65C 25/20; B65C 25/26; B65C 25/10; B65C 2025/125; B65C 35/14; B65C 25/18
See application file for complete search history.

(56) References Cited

U.S. PATENT DOCUMENTS 2,959,381 A * 11/1960 Hartel ..................... B64C 25/20
                                                    244/102 R
2,960,287 A * 11/1960 Barlow ................... B64C 25/20
                                                    244/102 R
(Continued)

FOREIGN PATENT DOCUMENTS

FR      2 139 182 A1    1/1973
FR      2 801 865 A1    6/2001
(Continued)

OTHER PUBLICATIONS

International Search Report for PCT/EP2013/075129 dated Apr. 3, 2014 English Translation.

*Primary Examiner* — Joseph W Sanderson
*Assistant Examiner* — Magdalena Topolski
(74) *Attorney, Agent, or Firm* — Sughrue Mion, PLLC

(57) ABSTRACT

Aircraft landing gear having a leg (12) for hinging to a structure of the aircraft so as to be movable between a deployed position and a retracted position, a main brace (15), a secondary brace (20), and a double-acting type unlocking actuator (30) having a first end coupled to the secondary brace and controllable for causing its links to move out of alignment against the action of the resilient member during retraction or deployment of the landing gear. The landing gear includes couplers (31, 33) for coupling to a second end of the unlocking actuator, which couplers ensure movement of said second end relative to the leg so that, for a given action, the unlocking actuator tends to break the alignment of the links when the landing gear is in one of (Continued)

its positions and tends to confirm said alignment when the landing gear is in its other position.

2 Claims, 1 Drawing Sheet

(56) References Cited

U.S. PATENT DOCUMENTS

| | | |
|---|---|---|
| 5,022,609 A | 6/1991 | Cranston |
| 9,145,204 B2 * | 9/2015 | Ducos ..................... B64C 25/20 |
| 2011/0163202 A1 | 7/2011 | Martinez et al. |
| 2013/0181091 A1 * | 7/2013 | Evans ..................... B64C 25/26 |
| | | 244/102 A |
| 2016/0167770 A1 * | 6/2016 | Toon ....................... B64C 25/20 |
| | | 244/102 R |

FOREIGN PATENT DOCUMENTS

| | | |
|---|---|---|
| FR | 2 928 623 A1 | 9/2009 |
| WO | 2010/139756 A1 | 12/2010 |

\* cited by examiner

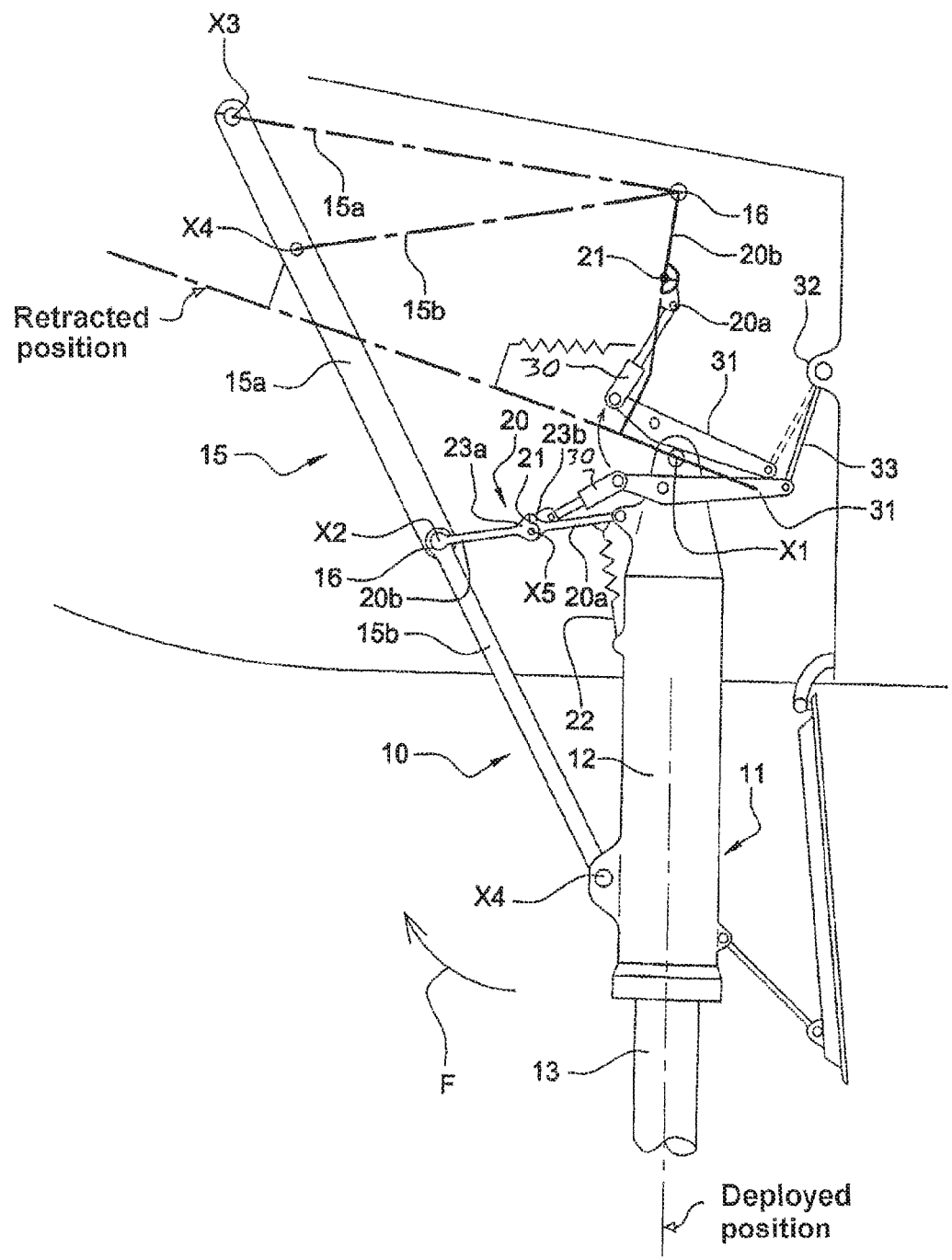

US 9,676,473 B2

LANDING GEAR WITH REALIGNING LOCK LINK ASSEMBLY

The invention relates to retractable aircraft landing gear with a secondary brace that returns to alignment when the landing gear is in the retracted position.

CROSS REFERENCE TO RELATED APPLICATIONS

This application is a National Stage of International Application No. PCT/EP2013/075129 filed Nov. 29, 2013, claiming priority based on French Patent Application No. 12 03253, filed Nov. 30, 2012, the contents of all of which are incorporated herein by reference in their entirety.

BACKGROUND OF THE INVENTION

Landing gear is known comprising a leg hinge-mounted to the structure of the aircraft so as to be movable between a deployed position and a retracted position. The leg is stabilized in the deployed position by at least one main brace comprising two links that are hinged together, one of the links being coupled to the leg and the other link being coupled to the structure of the aircraft. When the landing gear is in the deployed position, the two links of the main brace are held in a substantially aligned position by a locking device.

The locking device itself comprises a set of two links that are hinged together, one of the links being coupled to the main brace, while the other link is coupled either to the leg or to the structure of the aircraft. The two links are in a substantially aligned position when the landing gear is in the deployed position. The term "secondary alignment" is used to mean the alignment of the links of the locking device, as contrasted to the main alignment of the links of the main brace. That is why the locking device is also referred to as a secondary brace. The secondary alignment is generally maintained by springs that confirm the links in abutment one against the other when in the aligned position.

A single-acting unlocking actuator is coupled to one of the links in order to break the secondary alignment against the springs when it is desired to retract the landing gear.

It is known to provide a raising linkage in which the links of the secondary brace become realigned when the landing gear reaches the retracted position. The secondary brace, together with that one of the links of the brace that is hinged to the aircraft, then forms a rigid structure to which the leg of the landing gear is connected by the other link of the brace, thereby enabling the landing gear to be locked in the retracted position, and thus avoiding the need to use an uplock box for the landing gear. Nevertheless, in such a configuration, care must be taken to ensure that the action of the unlocking actuator is stopped before the links of the secondary brace are realigned, since otherwise the actuator would prevent any realignment. This requires sequencing to be used, and should that fail the landing gear would be prevented from locking in the retracted position.

OBJECT OF THE INVENTION

An object of the invention is to provide landing gear having a main brace and a secondary brace with operation that is simplified.

SUMMARY OF THE INVENTION

In order to achieve this object, the invention provides an aircraft landing gear comprising:

- a leg for hinging to a structure of the aircraft to be movable between a deployed position and a retracted position;
- a main brace having two links that are hinged together, one of them being coupled to the leg and the other being capable of being coupled to the structure of the aircraft, such that when the leg is in the deployed position, the links are substantially in alignment;
- a secondary brace comprising two links that are hinged together, one of them being coupled to the brace and the other being coupled to the leg, such that when the leg is in the deployed position or in the retracted position, the links are substantially in alignment with each other and they are held in their alignment by a resilient member confirming the links in abutment in the aligned position; and
- an unlocking actuator having a first end coupled to the secondary brace and operable to cause the links to move out of alignment during retraction or deployment of the landing gear against the action of the resilient member.

According to the invention, the unlocking actuator is of the double-acting type and the landing gear includes coupling means for coupling to a second end of the unlocking actuator, which means ensure movement of said second end relative to the leg so that, for a given action, the unlocking actuator tends to break the alignment of the links when the landing gear is in one of its positions and tends to confirm said alignment when the landing gear is in its other position.

In a particular embodiment, the second end of the unlocking actuator is hinged to the first end of a rocker that is hinged to the leg, the rocker having a second end that is connected to a stationary point of the structure of the aircraft by means of a guide link.

BRIEF DESCRIPTION OF THE DRAWING

The invention can be better understood with reference to the sole accompanying FIGURE showing a particular embodiment of landing gear of the invention in the deployed position together with chain-dotted center lines showing the same landing gear in the retracted position.

DETAILED DESCRIPTION OF THE INVENTION

In FIG. 1, there can be seen the outline of the nose of an aircraft together with the bay for nose landing gear 10. All of the hinge axes that are mentioned below are parallel to each other and are seen end-on in the FIGURE.

The landing gear 10, shown in its deployed position, comprises a leg 11 with a strut 12 that is hinged to the aircraft about an axis X1 and that receives a sliding rod 13 carrying wheels (not shown) at its end.

The leg 11 is stabilized in the deployed position by a main brace 15 comprising top and bottom links 15a and 15b that are hinged together about an axis X2 at a knee 16. The top link 15a is also hinged to the structure of the aircraft about an axis X3, while the bottom link is hinged to the leg 11 about an axis X4. In the position shown, the links 15a and 15b of the main brace 15 are substantially in alignment.

In order to hold the main brace in the aligned position, the landing gear has a secondary brace 20 comprising top and bottom links 20a and 20b that are hinged together at a knee 21 about an axis X5. The top link 20a is also hinged to the strut 12 about an axis X6, while the bottom link 20b is hinged to the main brace about an axis X2. In the position shown, the links 20a and 20b are substantially in alignment, and they are held in alignment by a spring 22 coupled between the strut 12 and the top link 20a to confirm abutment of the links one against the other. For this purpose, the links 20a and 20b have abutments 23a and 23b at the knee 21.

This is well known and is recalled merely for the purposes of illustration.

In the invention, the landing gear has a double-acting unlocking actuator 30 with one end coupled to the top link 20a of the secondary brace 20 and its other end hinged to the end of one of the arms of a rocker 31 that is itself hinge-mounted to the strut about an axis X7. The rocker has another arm with its end connected to a stationary point 32 of the structure of the aircraft by means of a guide link 33.

The assembly operates as follows. In the deployed position shown, each of the main and secondary braces 15 and 20 is in alignment. The spring 22 holds the links of the secondary brace 20 in the aligned position, thereby stabilizing and locking the main brace in the aligned position. The leg 11 is thus stabilized and locked in the deployed position.

When it is desired to retract the landing gear into the well after takeoff, the unlocking actuator 30 is operated so that it retracts. The unlocking actuator 30 then causes the secondary brace 20 to be taken out of alignment against the force exerted by the spring 22, thereby also taking the main brace 15 out of alignment.

A drive actuator (not shown) then pulls on the leg 11 so as to raise it to its retracted position (movement in the direction indicated by arrow F), with the retracted position being shown diagrammatically by chain-dotted lines. In the chain-dotted outline, there can be seen the leg 11, the links 15a and 15b of the main brace, which is folded, and also the links of the secondary brace, which links are once more in alignment and confirmed in their alignment by the spring 22.

The realignment of the secondary brace stiffens the assembly constituted by the leg 11, the bottom link 15b, and the secondary brace 20. This assembly is held in the retracted position by the top link 15a.

During this movement, it should be observed that the rocker 31 rocks into the position shown in dashed lines. The end of the unlocking actuator 30 which is coupled thereto follows a trajectory that is greater than that which it would have followed if it were merely coupled to the strut 12. It can thus be seen that the line of action of the unlocking actuator 30 (passing through its two coupled ends) changes side relative to the hinge of the top link 20a to the strut 12 when the leg reaches the retracted position. Thus, by continuing to operate the unlocking actuator 30 so that it retracts, it now confirms the secondary brace in its alignment, which is the looked-for result, and it then acts to hold the landing gear in the retracted position by the effect of the realignment of the secondary brace.

Conversely, when it is desired to move the landing gear to its deployed position, the unlocking actuator 30 is operated so that it lengthens. This breaks the alignment of the secondary brace 20 and thus of the main brace 15. The leg is no longer held so it moves downwards under the effect of gravity, or under drive from the drive actuator. On reaching the deployed position, both the main brace 15 and the secondary brace 20 move back into alignment, and the unlocking actuator, with its line of action changing sides, now tends to confirm the alignment of the secondary brace 15, while still pushing.

The relative movement of the end of the unlocking actuator 30 coupled to the rocker 31 thus inverts the effect of the action of the actuator on the secondary brace. Whereas in one of the positions of the landing gear, action of the actuator tends to break the alignment of the secondary brace, in the other position of the landing gear, the same action tends on the contrary to confirm the alignment of the secondary brace. There is thus no need to provide a device for interrupting or reversing the action of the unlocking actuator during the movement of the landing gear, thereby considerably simplifying sequencing for driving the landing gear.

The invention is not limited to the above description, but on the contrary covers any variant coming within the ambit defined by the claims. In particular, although in the example shown the unlocking actuator is coupled to a rocker mounted pivotally on the leg of the landing gear, it is possible more generally to use any coupling means for ensuring relative movement between the coupled end of the actuator and the leg so that the line of action of the actuator changes side relative to the hinge of the secondary brace with the leg when the landing gear passes from the deployed position and the retracted position.

The invention claimed is:

1. An aircraft landing gear comprising:
    a leg (11) for hinging to a structure of the aircraft to be movable between a deployed position and a retracted position;
    a main brace (15) having a first set of two links (15a, 15b) that are hinged together, one link of the first set of links being coupled to the leg and the other link of the first set of links being capable of being coupled to the structure of the aircraft, such that when the leg is in the deployed position, the two links in the first set of links are substantially in alignment;
    a secondary brace (20) comprising a second set of two links (20a, 20b) that are hinged together, one link of the second set of links being coupled to the main brace and the other link of the second set of links being coupled to the leg, such that when the leg is in the deployed position, the two links in the second set of links are substantially in alignment with each other and they are held in their alignment by a resilient member (22) confirming the two links in the second set of links in abutment in the aligned position; and that, when the leg is in the retracted position, the two links in the second set of links are substantially in alignment with each other and are held in alignment by the resilient member (22) confirming the two links in the second set of links in abutment in the aligned position; and
    an unlocking actuator (30) having a first end coupled to the secondary brace and operable to cause the two links in the second set of links to move out of alignment during retraction or deployment of the landing gear by acting against the action of the resilient member;
    wherein the unlocking actuator is of the double-acting type, and
    wherein the landing gear includes couplers (31, 33) for coupling to a second end of the unlocking actuator, said couplers ensuring movement of said second end relative to the leg so that, for a given action, the unlocking actuator tends to break the alignment of two links in the second set of links when the landing gear is in one of the deployed position or the retracted position and tends to confirm said alignment when the landing gear is in the other of the deployed position or retracted position.

2. The aircraft landing gear according to claim 1, wherein the couplers comprise a rocker (31) hinge-mounted to the leg (11) of the landing gear, the unlocking actuator being coupled at one end to an arm of the rocker that has another arm with an end connected to a stationary point (32) of the structure of the aircraft by a guide link (33).

\* \* \* \* \*